(12) United States Patent
Mockridge

(10) Patent No.: US 6,205,624 B1
(45) Date of Patent: Mar. 27, 2001

(54) HOSE CLIP AND A LOCKING MEMBER THEREFOR

(75) Inventor: Anthony Trevor Mockridge, Sudbury (GB)

(73) Assignee: JCS Hi-Torque Limited, Sudbury (GB)

(*) Notice: Subject to any disclaimer, the term of this patent is extended or adjusted under 35 U.S.C. 154(b) by 0 days.

(21) Appl. No.: 09/155,305

(22) PCT Filed: Jan. 29, 1998

(86) PCT No.: PCT/GB98/00190

§ 371 Date: Sep. 21, 1998

§ 102(e) Date: Sep. 21, 1998

(87) PCT Pub. No.: WO98/33000

PCT Pub. Date: Jul. 30, 1998

(30) Foreign Application Priority Data

Jan. 29, 1997 (GB) .................................................. 9701760
Jul. 14, 1997 (GB) .................................................. 9714662

(51) Int. Cl.⁷ ...................................................... F16L 33/08
(52) U.S. Cl. ............................... 24/274 R; 24/19; 24/182
(58) Field of Search ............................... 24/274 R, 274 P, 24/274 WB, 19, 23 R, 23 B, 22, 176, 182

(56) References Cited

U.S. PATENT DOCUMENTS

| | | | |
|---|---|---|---|
| 59,443 | * | 11/1866 | Onions . |
| 102,076 | * | 4/1870 | Adair . |
| 201,003 | * | 3/1878 | Goldsmith . |
| 2,419,662 | * | 4/1947 | Sutton . |
| 3,175,233 | * | 3/1965 | Caravella . |
| 4,956,898 | * | 9/1990 | Miyamura et al. . |
| 4,972,558 | * | 11/1990 | Maio et al. . |

FOREIGN PATENT DOCUMENTS

2315854 * 10/1974 (DE) .

* cited by examiner

*Primary Examiner*—James R. Brittain
(74) *Attorney, Agent, or Firm*—Renner, Kenner, Grieve Bobak, Taylor & Weber

(57) ABSTRACT

A locking member (20) for use with a worm-drive hose clip having a strap (15) of encircling an article to be clamped is arranged for slidable mounting on the main part (15) of the strap. When so mounted, the free end (17) of the strap may be entered into the locking member (20) which has a retaining portion (27) adapted to lie against the inwardly directed face of the strap so as to be clamped between the strap (15) and an article (28), on tightening of the clip around the article. The locking member (20) also has a catch member (23) which engages one of the worm-drive abutments (18) on the free end (17) of the strap so that once the clip is tightened, the catch member (23) resists withdrawal of the free end (17) from the locking member (20).

19 Claims, 4 Drawing Sheets

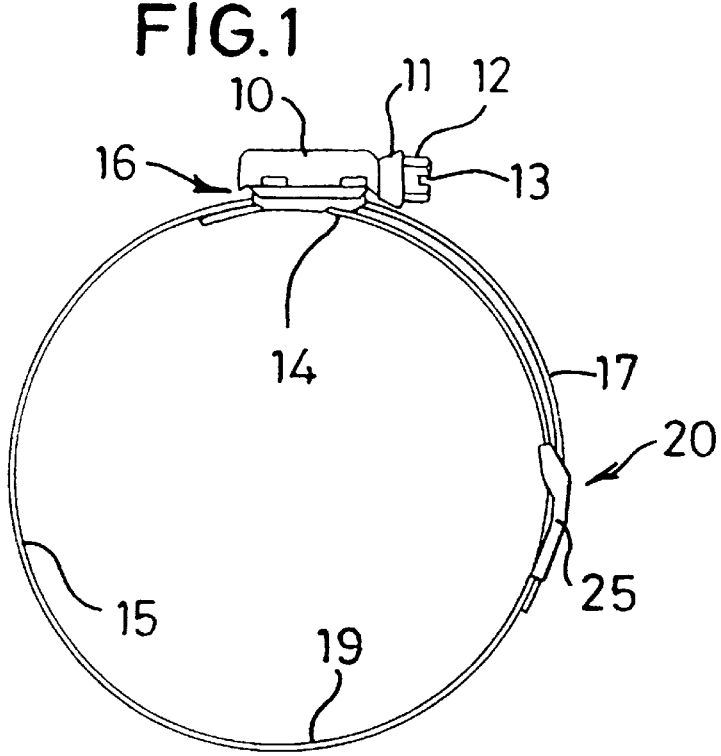
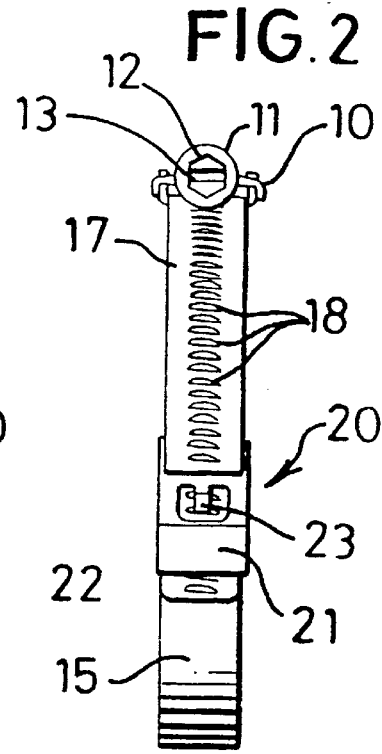
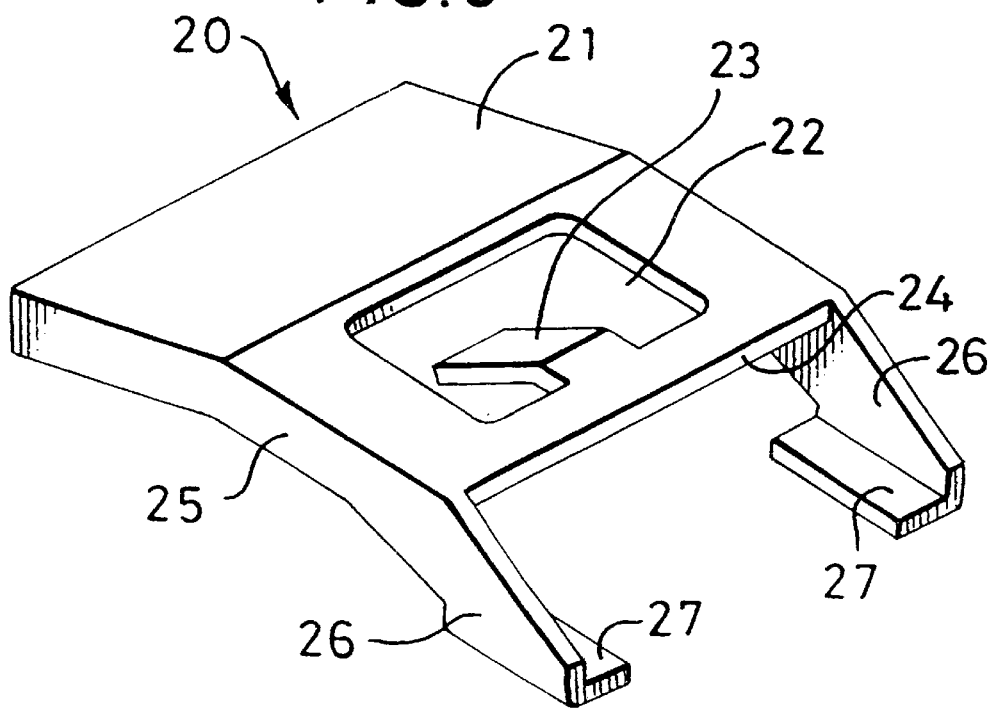

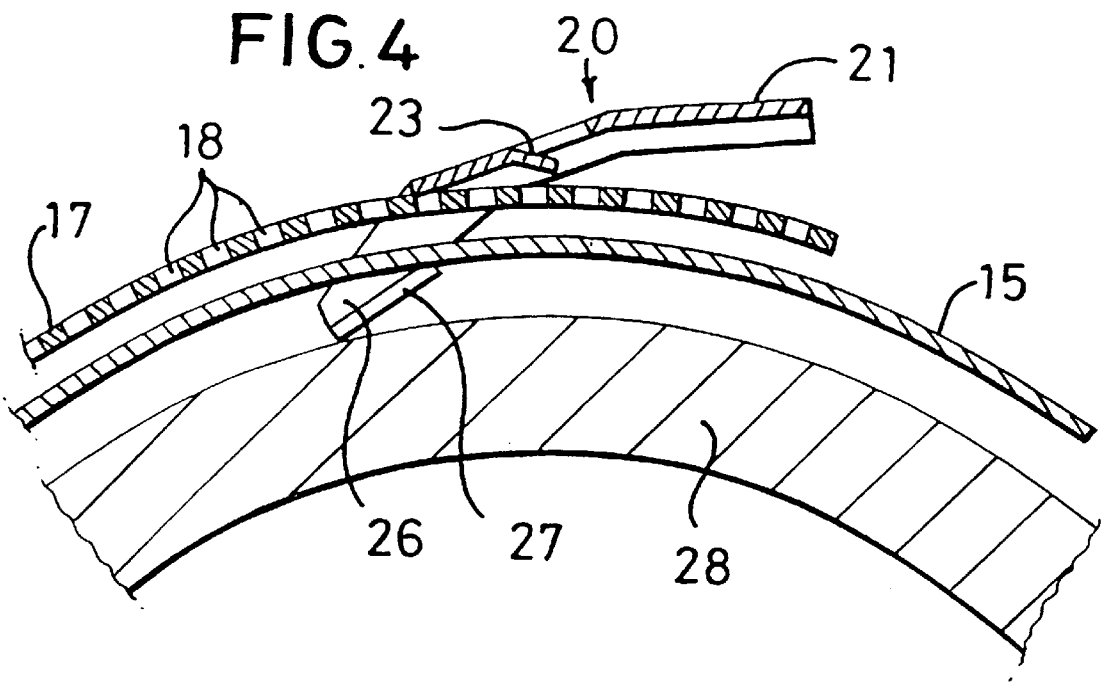
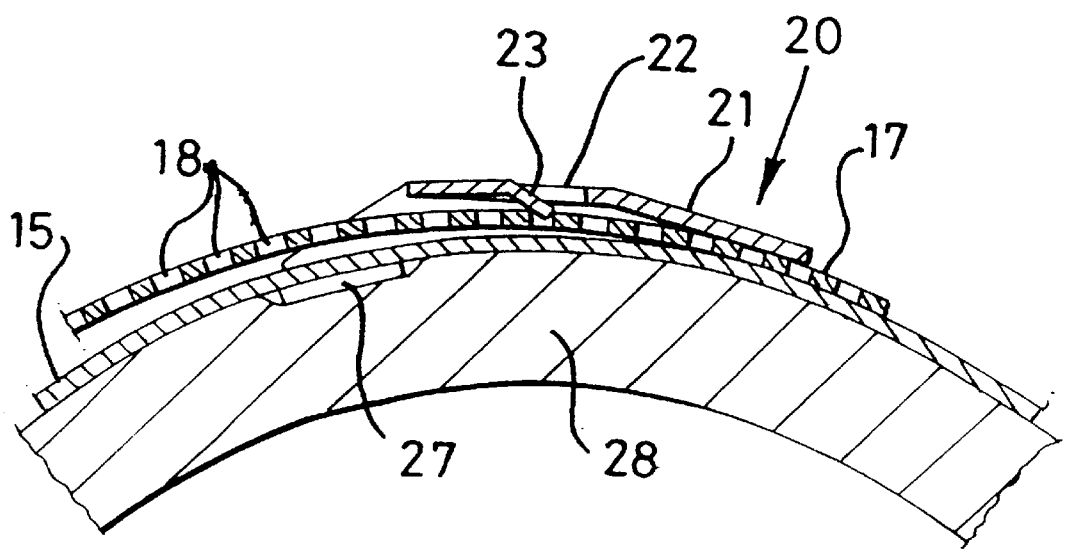

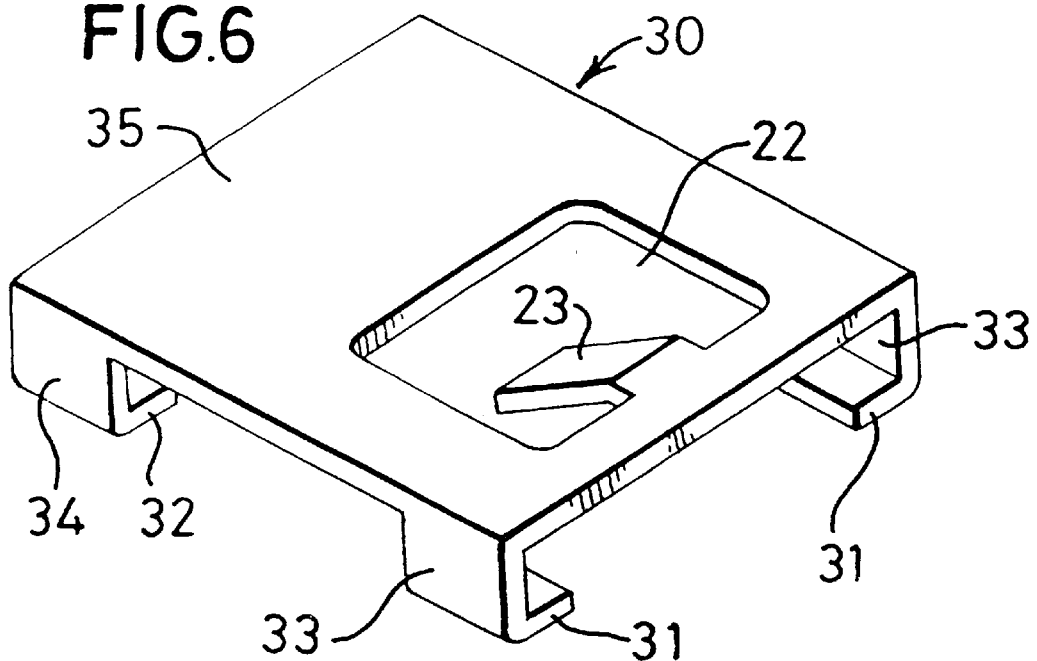
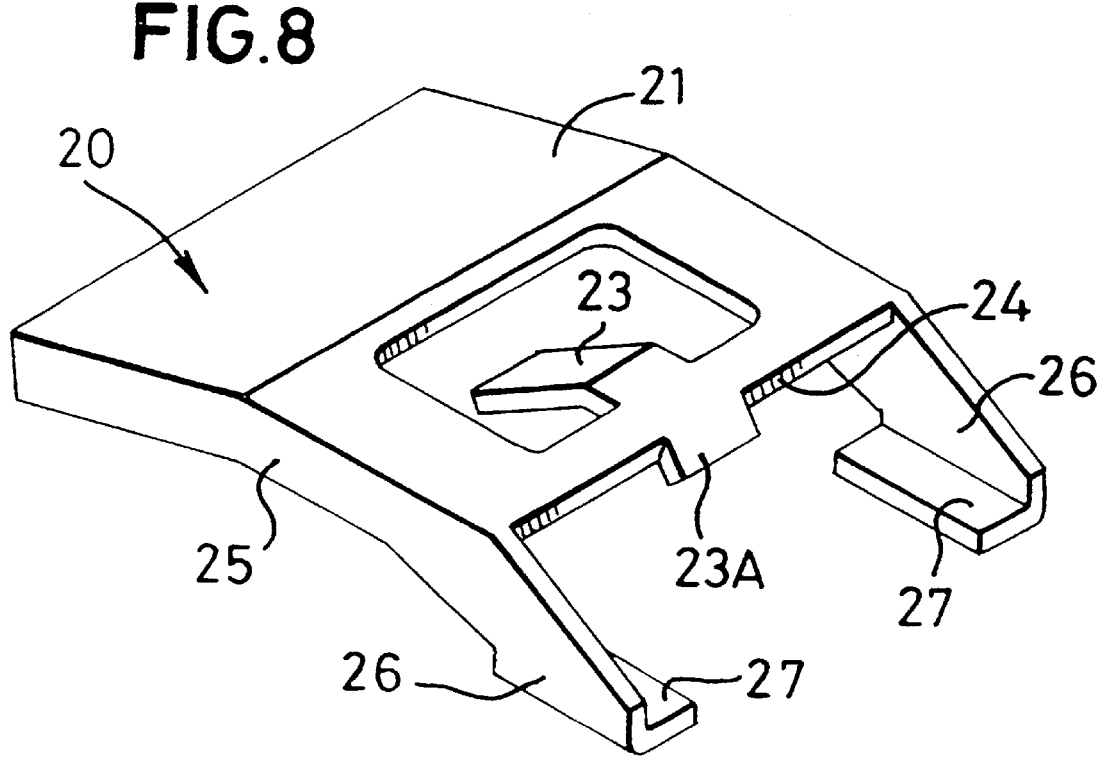

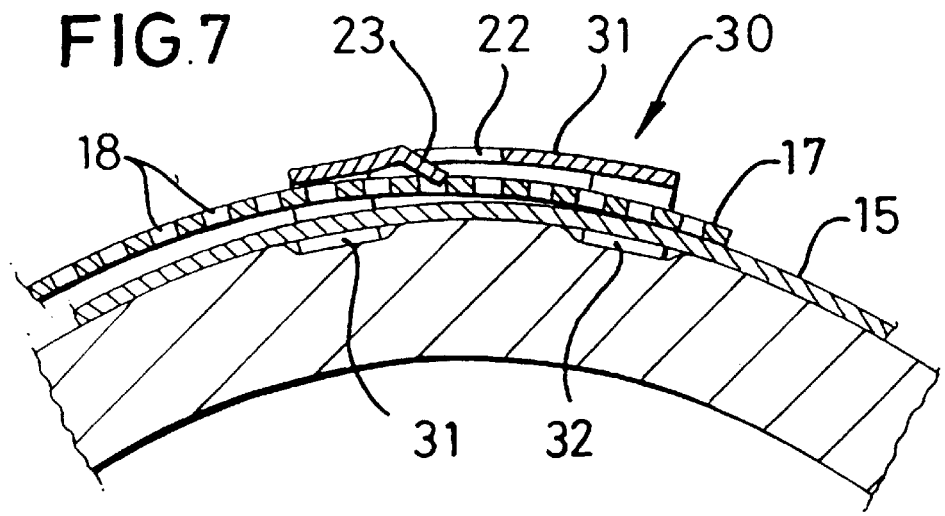
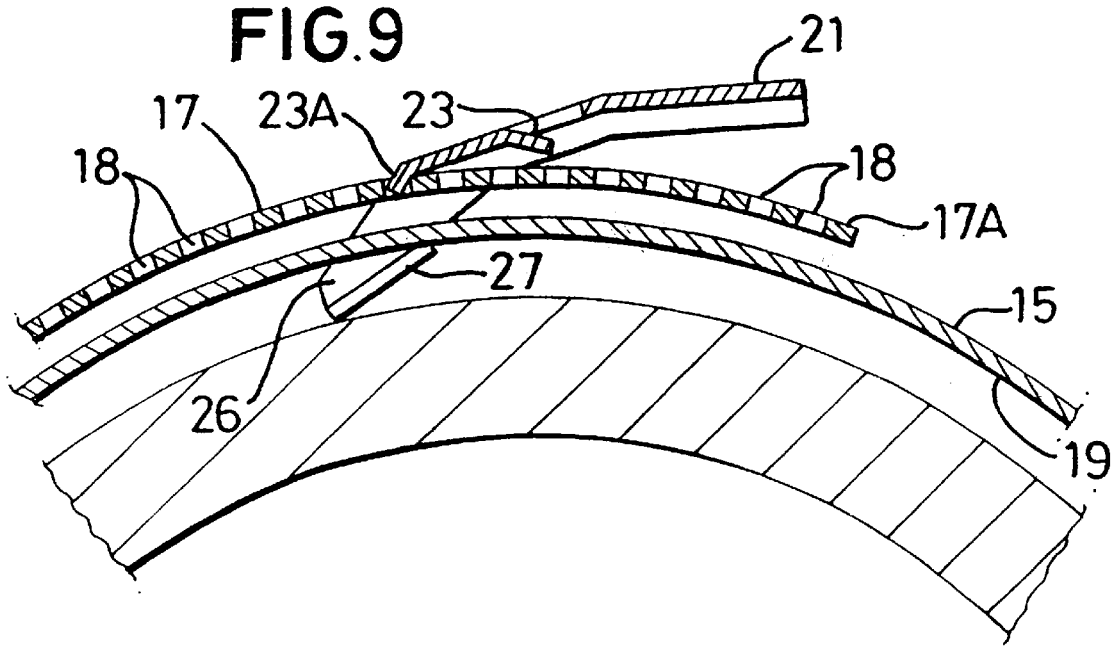
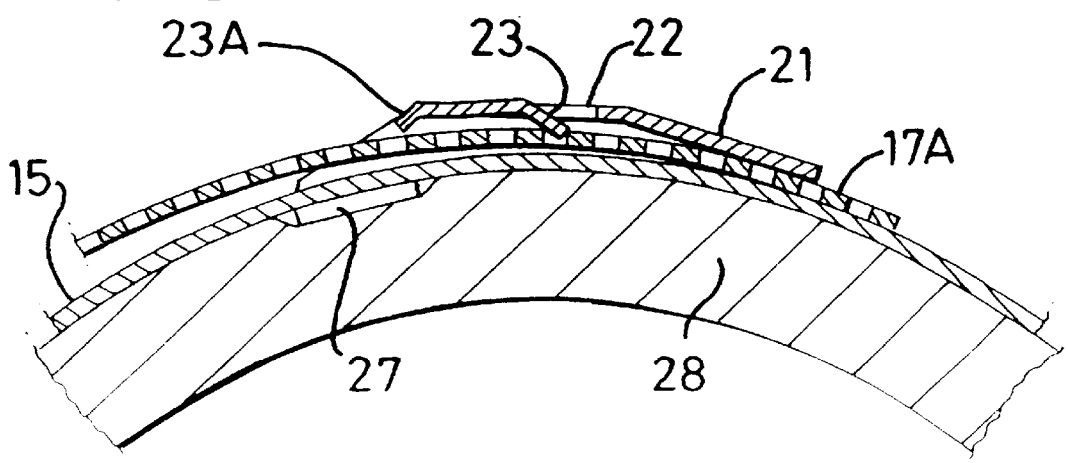

HOSE CLIP AND A LOCKING MEMBER THEREFOR

This invention relates to a hose clip having a locking member for trapping the free end of the hose clip strap, and also to a locking member suitable for use with a hose clip, for this purpose.

A known form of hose clip has a housing to which is connected one end of a strap having a series of abutments along the length thereof. The strap is curled round in a circular manner so that the other end portion passes through the housing, a worm rotatably mounted in the housing engaging the abutments of the other end portion so that rotation of the worm decreases or increases the circumferential length of the encircling part of the strap, depending upon the sense of rotation of the worm.

Though a clamping device as described above is conventionally referred to as a "hose clip" (or in the U.S. as a "hose clamp"), it may be used for many purposes besides the clamping of a flexible hose to a rigid stub over which the hose is passed. The term "hose clip" should not therefore be regarded as limited to a device exclusively for the clamping of a hose and is used herein in a broad sense, to refer to the generic kind of clamping device discussed above.

It is known to attach various types of street signs to lamp posts, telegraph posts or the like by means of metal bands. The fitting of these requires special equipment and the bands must be cut when they are to be removed. These operations require special tools and to simplify the fitting and removal of such signs, it has been proposed to use hose clips of the kind described above.

A problem associated with hose clips as described above is that if the tightening of the hose clip around an object requires the circumferential length of the strap to be reduced significantly from the initial position where the free end of the strap is just engaged with the housing, there is then a relatively long free end portion projecting from the housing. That free end portion will stand away from the encircling part of the strap and is likely to cause injuries to someone in the immediate vicinity of the strap.

Though it would be possible to provide a simple loop around the strap and through which the free end portion may be passed, in a manner similar to that used with a conventional adjustable belt and buckle, the free end portion may easily be removed from such a loop following complete tightening of the hose clip. Such an arrangement would not be at all suitable for use in an area to which the public has access and which might be susceptible to even mild vandalism. For this reason, the use of hose clips for example to mount street signs to lamp posts and so on has in general not been widely adopted.

It is a principal aim of the present invention to provide means whereby the free end portion of the strap of a hose clip may be trapped in a safe manner and in such a way that the end may not be released when the hose clip is clamped to an object, so enabling the clip to be used in circumstances where a projecting free end portion would not be acceptable.

According to one aspect of the present invention, there is provided a locking member for use with a worm-drive hose clip having a strap for encircling an article to be clamped, the strap having a plurality of abutments spaced therealong for engagement by the worm, which locking member is arranged for slidable mounting on the strap and is configured such that when so mounted the free end of the strap may be entered thereinto, the locking member having a retaining portion adapted to lie against the inwardly-directed face of the strap so as to be clamped between the strap and said article on tightening of the strap therearound, and the locking member further having a catch member engageable with the free end of the strap when said free end is inserted into the locking member, which catch member thereafter resists withdrawal of said free end from the locking member.

According to a second aspect of this invention, there is provided a worm-drive hose clip having a strap for encircling an article to be clamped, which strap has a plurality of abutments spaced therealong for engagement by the worm, and a locking member slidably mounted on the strap and configured to permit the free end of the strap to be entered thereinto, the locking member having a retaining portion which lies against the inwardly-directed face of the strap for clamping between the strap and said article on tightening the strap therearound and a catch member engageable with the free end of the strap on inserting said free end into the locking member, so as to resist the withdrawal of said free end from the locking member.

It will be appreciated that the locking member carried on the strap of a hose clip has a catch member which serves to engage the free end of the strap when the clip has fully been tightened around an object, in such a way that the free end portion of the strap cannot be released from the locking member. Thus, the free end portion is held close against the encircling part of the strap and the risk of injury from projecting parts of the clip is minimised. This effect may be enhanced by having the catch engaging the abutments on the free end of the strap.

In a preferred embodiment, the locking member is made from a piece of sheet metal, by appropriate forming operations. Such a locking member may have an upper portion adapted to overlie the strap and to define in conjunction therewith a channel into which the free end of the strap may be inserted. In this case, the catch member advantageously is in the form of a tooth projecting downwardly and forwardly from the upper portion of the locking member towards the outwardly-directed face 6f the strap and in the direction of insertion of the free end of the strap into the channel.

In one embodiment of locking member, the retaining portion engages the inwardly directed face of the strap to hold the upper portion substantially parallel to the part of the strap over which the upper portion lies. In an alternative embodiment, the retaining portion is adapted to allow the locking member to pivot with respect to the strap other than when the strap has been tightened around an article. This may be achieved by the retaining portion engaging the inwardly-directed face of the strap at a position proximate one end of the upper portion, the free end of the strap being inserted into said one end of the locking member.

As a result of trials and tests on both the locking member and a worm drive hose clip using that locking member, both as described above, it has become apparent that the positioning of the locking member in the required final position can be a little awkward to perform, prior to final tightening of the clip. As a consequence, an improved form of locking member has been developed, which has a tang engageable with an abutment of the hose clip strap adjacent the free end thereof, prior to the tightening of the hose clip, so that the locking member remains in the region of the free end of the strap during fitting and initial tightening of the clip. On final tightening of the clip, the retaining portion of the locking member will overlie the free end of the strap to prevent the removal thereof from the locking member.

For the improved embodiment of locking member, the tang is somewhat similar to the catch member, and thus projects downwardly from the upper portion of the locking member towards the upwardly directed face of the strap. Unlike the catch member, which projects forwardly from the upper portion of the locking member and thus in the direction of insertion of the free end of the strap into the channel defined by the locking member, the tang should project downwardly and rearwardly, and so in the opposite direction to that of the catch member.

By way of example only, three specific embodiments of locking members for use with worm-drive hose clips will now be described in detail, reference being made to accompanying drawings, in which:

FIG. 1 is an edge-view of a conventional worm-drive hose clip carrying the first embodiment of locking member of this invention;

FIG. 2 is a side-view on the part of the hose clip of FIG. 1 carrying the locking member;

FIG. 3 is an isometric view of the first embodiment of locking member;

FIG. 4 is a detailed view in section of the hose clip and locking member of FIGS. 1 and 2, prior to tightening;

FIG. 5 is a view similar to that of FIG. 4 but with the hose clip tightened;

FIG. 6 is an isometric view of the second embodiment of locking member;

FIG. 7 is a detailed view in section of the hose clip and locking member of FIG. 6, with the hose clip tightened;

FIG. 8 is an isometric view of the improved form of locking member;

FIG. 9 is a detailed view in section of a hose clip and locking member of FIG. 8, prior to tightening; and FIG. 10 is a view similar to that of FIG. 9 but with the hose clip tightened.

FIGS. 1 and 2 show a conventional design of worm-drive hose clip comprising a housing 10 in which is rotatably mounted a worm having a head 11. The head has a hexagonal portion 12 and also a cross-slot 13 either of which may be employed to effect rotary motion of the worm. For certain intended uses, the worm may have a security head requiring the use of a special tool to effect the rotation thereof.

The housing 10 is connected to one end region 14 of a strap 15, which strap is curled round so as to reenter the housing at 16 for engagement by the worm therein, the free end portion 17 of the strap projecting beyond the housing. A series of abutments 18 is formed at least part way along the strap from the free end thereof. The abutments may be defined by a series of slots formed through the strap, or may comprise raised or indented portions formed by a pressing operation.

The hose clip of FIGS. 1 and 2 is provided with a locking member 20, slidably mounted on the encircling part of the strap 15. As best seen in FIG. 3, the locking member 20 is formed by a pressing operation from sheet metal so as to have an upper surface 21 in which there is an aperture 22, there being a catch 23 projecting downwardly and forwardly from end 24 of the upper surface 21 Along the two sides of the upper surface 21 are flanges 25 which project beyond end 24 of the upper surface. The projecting parts 26 of the flanges 25 are turned over to form lugs 27, engageable against the inwardly directed surface 19 of the strap 15.

In use, the hose clip of FIGS. 1 and 2, carrying the locking member 20, is fitted around the article to be clamped, such as the cylindrical object shown in part at 28 in FIG. 4. If appropriate, the free end portion 17 may be disengaged from the housing 10 by counter-clockwise rotation of the worm, to permit the strap to be passed round the object 28 whereafter the free end portion is re-engaged with the housing. The hose clip is then lightly tightened around the object by clockwise rotation of the worm and the locking member 20 is then slid along the strap whilst the free end portion 17 is held against the strap, until the free end portion is caught beneath upper surface 21 of the locking member, as shown in FIG. 4. During this action, the upper surface 21 may pivot away from the outwardly-directed surface of the strap 15 to facilitate the passage of the free end portion 17 below the upper surface of the locking member 20.

Subsequent tightening of the hose clip by continued clockwise rotation of the worm clamps the lugs 27 between object 28 and the inwardly directed surface 19 of strap 15 and object 28 and the applied pressure to those lugs pivoting the upper surface 21 downwardly so as to lie substantially parallel to the adjacent surface of the strap 15, as shown in FIG. 5. This action engages catch 23 with an abutment 18 in the free end portion of the strap. When fully tightened, the catch 23 traps the free end portion of the strap and prevents the removal thereof from the locking member. The free end of the strap may be finally pushed into the locking member when the clip has been fully tightened to ensure the free end lies as close as possible to the encircling part of the strap.

Should it be desired to free the hose clip from object 28, the worm is rotated counter-clockwise, so relieving the pressure on lugs 27 and permitting the locking member to turn back to the position illustrated in FIG. 4. The locking member may then be slid along the strap to release the free end portion, whereafter removal of the hose clip may proceed in the conventional manner.

FIGS. 6 and 7 show a second embodiment of locking member, for use in circumstances where a more permanent installation is required. In these drawings, like parts with those of FIGS. 1 to 5 are given like reference characters and will not be described again here.

The locking member 30 shown in FIG. 6 has two pairs of opposed lugs 31 and 32, projecting inwardly from side flanges 33 and 34 respectively, at the two ends of upper surface 35 of the locking member 30. The upper surface 35 is substantially planar and the lugs 31 and 32 are arranged so that the upper surface always remains substantially parallel to the part of the strap over which the upper surface 35 lies.

A hose clip carrying the locking member 30 shown in FIG. 6 is used in much the same way as a hose clip carrying the locking member 20 of FIG. 3. However, on completion of the tightening of the hose clip with the free end portion 17 of the strap caught beneath the upper surface 35 of the locking member 30, the free end portion 17 cannot be released, even if the worm is turned counter-clockwise to loosen the hose clip. Should it be desired to remove the hose clip, either the strap 15 must be cut at a suitable position, or the locking member 30 must be prised away from the strap, to release the free end of the strap.

FIG. 8 shows the modified form of the locking member and, as compared to FIG. 3, it can be seen that projecting centrally from end 24 of the upper surface 21 is a tang 23A, that tang being directed downwardly and rearwardly, as compared to catch 23. The tang 23A is also shorter than catch 23, but need not be in other embodiments of this invention.

The locking member of FIG. 8 is used in conjunction with a hose clip such as that illustrated in FIGS. 1 and 2, in much the same manner as the locking member 20 of FIG. 3. The locking member is mounted on the hose clip which is then fitted round the article to be clamped, such as the cylindrical object 28 illustrated in FIGS. 9 and 10. The modified locking member is positioned closely adjacent the free end 17A of the strap 15 and prior to tightening, the locking member is pivoted up as shown in FIG. 9, so that tang 23A engages an abutment 18 of the strap. In the illustrated form of hose clip, where the abutments are defined by a series of slots through the strap, the tang 23A may locate in a slot though it is preferred that the length of the tang is such that it does not project to any material extent beyond the inwardly directed face of the free end of the strap.

As the strap is tightened by rotating the worm of the hose clip, the locking member will remain over the free end 17A of the strap, irrespective of relative movement between the strap free end portion 17 and the underlying major strap portion 15.

As with the previous embodiments of locking member described above, continued tightening of the clamp serves to clamp the lugs 27 between object 28 and the inwardly directed surface 19 of strap 15 and object 28. The applied pressure to those lugs pivots the upper surface 21 downwardly so as to lie substantially parallel to the adjacent surface of the strap 15, as shown in FIG. 10. This action engages catch 23 with an abutment 18 in the free end portion of the strap. The same action lifts tang 23A clear of the abutments 18, to permit the free end of the strap to be finally pushed into the locking member, to ensure the free end lies as close as possible to the encircling part of the strap. As will be appreciated, when fully tightened, the catch 23 traps the free end portion of the strap and prevents the removal thereof from the locking member.

The hose clip may be released in the same manner as has been described above, for the previous embodiments.

What is claimed is:

1. A worm-drive hose clip having a strap for encircling an article to be clamped, which strap has a plurality of abutments spaced therealong for engagement by the worm, and a locking member slidably mounted on the strap and configured to permit the free end of the strap to be entered thereinto, the locking member having a retaining portion which lies against the inwardly-directed face of the strap for clamping between the strap and said article on tightening the strap therearound, and a catch member engageable with the free end of the strap on inserting said free end into the locking member, so as to resist the withdrawal of said free end from the locking member.

2. A worm-drive hose clip as claimed in claim 1, wherein the catch member is engageable with the abutments on the free end of the strap.

3. A worm-drive hose clip as claimed in claim 1, wherein the locking member has an upper portion adapted to overlie the strap and to define in conjunction therewith a channel into which the free end of the strap may be inserted.

4. A worm-drive hose clip as claimed in claim 3, wherein the catch member is in the form of a tooth projecting downwardly and forwardly from the upper portion of the locking member towards the outwardly-directed face of the strap and in the direction of insertion of the free end of the strap into the channel.

5. A worm-drive hose clip as claimed in claim 3, wherein the retaining portion of the locking member engages the inwardly directed face of the strap to hold the upper portion substantially parallel to the part of the strap over which the upper portion lies.

6. A worm-drive hose clip as claimed in claim 5, wherein the retaining portion of the locking member comprises at least two pairs of fingers spaced along the length of the strap and arranged to hook around the inwardly-directed face of the strap.

7. A worm-drive hose clip as claimed in claim 5, wherein the retaining portion is in the form of a plate held spaced from and substantially parallel to the upper portion of the locking member.

8. A worm-drive hose clip as claimed in claim 5, wherein the upper and retaining portions together define a band which encircles the strap for sliding movement therealong.

9. A worm-drive hose clip as claimed in claim 1, wherein the locking member has a tang engageable with an abutment of the hose clip strap, adjacent the free end thereof and prior to tightening of the hose clip, so that the locking member remains in the region of said free end during fitting and initial tightening of the clip.

10. A worm-drive hose clip as claimed in claim 9, wherein the tang projects downwardly from the upper portion of the locking member towards the upwardly directed face of the strap.

11. A worm-drive hose clip as claimed in claim 10, wherein the tang projects downwardly and rearwardly from the upper portion of the locking member, in the opposite direction to the catch member.

12. A worm-drive hose clip as claimed in claim 1, wherein the retaining portion is adapted to allow the locking member to pivot with respect to the strap other than when the strap has been tightened around an article.

13. A worm-drive hose clip as claimed in claim 12, wherein the retaining portion has a pair of opposed fingers which engage the inwardly-directed face of the strap.

14. A worm-drive hose clip as claimed in claim 12, wherein the retaining portion engages the inwardly-directed face of the strap at a position proximate the end of the upper portion at which the free end of the strap is inserted into the locking member.

15. A worm-drive hose clip as claimed in claim 14, wherein the retaining portion engages the inwardly-directed face of the strap at a position spaced along the strap from said end of the upper portion.

16. A worm-drive hose clip as claimed in claim 15, wherein the locking member has a bend part-way along its length in the same sense as the curvature of the encircling part of the strap.

17. A worm-drive hose clip as claimed in any of claim 1, wherein the locking member comprises a one-piece pressing formed from sheet metal.

18. A worm-drive hose clip comprising:

a strap for encircling an article to be clamped and having first and second ends;

a plurality of abutments spaced along the strap for at least part of the length thereof, from the first end of the strap;

a housing mounted on the second end of the strap and through which housing the first end of the strap passes;

a worm rotatably mounted in said housing and engaged with the abutments on the strap; and a locking member mounted on the strap for sliding movement therealong and configured to permit the first end of the strap to be inserted thereinto, which locking member has:

a retaining portion which lies against a face of the strap which in uses engages the article to be clamped so that the retaining portion is clamped between the strap and the article; and a catch member engageable with the first end of the strap on inserting the first end into the locking member so as to resist withdrawal of the first end once the retaining portion has been clamped between the strap and said article.

19. A locking member for use with a worm-drive hose clip having a strap for encircling an article to be clamped, the strap having a plurality of abutments spaced therealong for engagement by the worm, which locking member comprises a body defining an upper surface having opposed side edges, a pair of side flanges projecting downwardly from said opposed side edges, and a pair of opposed in-tuned lugs formed one on each flange respectively, and extending for a part only of the length of the body whereby a channel-shaped aperture is defined by said upper surface, the side flanges and the lugs for slidably receiving the strap when in use, said aperture being configured to permit the free end of the strap also to be entered thereinto, the lugs being adapted to lie against the inwardly-directed face of the strap so as to be clamped between the strap and said article on tightening of the strap therearound, and the upper surface of the locking member providing a catch member directed inwardly of the aperture at a location spaced along the length of the body from the lugs which catch member is engageable with an abutment of the free end of the strap when said free end is inserted into the aperture and the clip is tightened on to an article, said catch member thereafter resists withdrawal of said free end from the locking member.

\* \* \* \* \*